(12) United States Patent
Bhattacharjya

(10) Patent No.: US 6,862,366 B2
(45) Date of Patent: Mar. 1, 2005

(54) TECHNIQUES FOR SCRATCH AND DATE REMOVAL FROM SCANNED FILM

(75) Inventor: Anoop Bhattacharjya, Campbell, CA (US)

(73) Assignee: Seiko Epson Corporation, Tokyo (JP)

(*) Notice: Subject to any disclaimer, the term of this patent is extended or adjusted under 35 U.S.C. 154(b) by 705 days.

(21) Appl. No.: 09/952,691

(22) Filed: Sep. 13, 2001

(65) Prior Publication Data

US 2003/0053707 A1 Mar. 20, 2003

(51) Int. Cl.⁷ .............................. G06K 9/00; G06K 9/40
(52) U.S. Cl. ........................ 382/164; 382/262; 382/275
(58) Field of Search ................... 382/162–165, 382/167, 172–173, 251, 254, 260, 262, 264, 300, 274–276; 358/463, 534; 348/241, 607, 625; 356/237.1

(56) References Cited

U.S. PATENT DOCUMENTS

| | | | |
|---|---|---|---|
| 4,941,186 A | 7/1990 | Massmann | 382/275 |
| 5,384,865 A | 1/1995 | Loveridge | 382/262 |
| 5,627,918 A | 5/1997 | Carasso | 382/254 |
| 5,694,228 A | 12/1997 | Peairs et al. | 358/538 |
| 5,892,853 A | 4/1999 | Hirani et al. | 382/280 |
| 5,974,194 A | 10/1999 | Hirani et al. | 382/262 |
| 6,035,072 A | 3/2000 | Read | 382/275 |
| 6,075,590 A * | 6/2000 | Edgar | 356/237.1 |
| 6,075,889 A * | 6/2000 | Hamilton et al. | 382/167 |
| 6,163,324 A | 12/2000 | Holder | 345/505 |
| 6,167,152 A | 12/2000 | Schildkraut | 382/163 |
| 6,192,155 B1 * | 2/2001 | Fan | 382/232 |
| 6,393,160 B1 * | 5/2002 | Edgar | 382/275 |
| 6,418,243 B1 * | 7/2002 | Skoglund et al. | 382/274 |
| 6,476,803 B1 * | 11/2002 | Zhang et al. | 345/419 |
| 6,498,867 B1 * | 12/2002 | Potucek et al. | 382/274 |
| 6,640,015 B1 * | 10/2003 | Lafruit et al. | 382/260 |
| 6,683,995 B2 * | 1/2004 | Ford et al. | 382/275 |

* cited by examiner

Primary Examiner—Andrew W. Johns
Assistant Examiner—Amir Alavi
(74) Attorney, Agent, or Firm—Michael T. Gabrik

(57) ABSTRACT

Techniques for removing from scanned film regions of "missing data" which may include date regions, or may be the result of spots, scratches or folds on the film. Such techniques are particularly designed to handle larger regions of missing data, such as "thick" scratches. The techniques of the present invention segment missing data regions (which may include characters in a date field) and perform component filtering which involves determining the area/perimeter ratio of each segmented missing data region. Only those regions whose area/perimeter ratio is less than a certain threshold are kept for closest-to-radial-based-function (CRBF) filtering to estimate colors from neighboring pixels to fill in the missing data regions.

21 Claims, 4 Drawing Sheets or

TECHNIQUES FOR SCRATCH AND DATE REMOVAL FROM SCANNED FILM

BACKGROUND OF THE INVENTION

1. Field of the Invention

This invention relates to techniques for removing from scanned film dates and/or missing data regions that can be the result of spots, scratches or folds on the film. The techniques of the present invention, which may be implemented in an apparatus and/or as methods, are particularly designed to handle larger regions of missing data, such as "thick" scratches. The invention also relates to programs of instructions for directing an apparatus or machine to carry out these techniques.

2. Description of the Related Art

Current methods for removing scratches from scanned film are designed for thin scratches which are only a few pixels wide. The removal of these artifacts typically involve either median or mean filtering. However, there are drawbacks with both of these methods when larger missing data regions are involved. The problem is that a median filter is sensitive only to the color histograms of pixels in a neighborhood, not to the spatial distribution of these pixels. Therefore, application of a median filter on a larger region of missing data tends to produce "blocky" artifacts. Mean filtering, on the other hand, tends to blur regions and boundaries in the process of attempting to remove larger missing data regions.

OBJECTS AND SUMMARY OF THE INVENTION

Objects of the Invention

Therefore, it is an object of the present invention to overcome the aforementioned problems.

It is another object of this invention to provide techniques for identifying missing data regions (which may include characters in a date field) and performing multiple filtering operations, one of which is performed using a "closest to radial basis function" (CRBF) approach.

SUMMARY OF THE INVENTION

One aspect of this invention involves a method for processing data in at least one portion of film that has been scanned to generate a pixel representation. The method comprises the steps of: segmenting at least one portion of the pixel representation to identify at least one region of missing data; calculating an area/perimeter ratio for each identified region of missing data; and subjecting each identified region of missing data having an area/perimeter ratio less than a predetermined maximum to a closest-to-radial-based-function filtering operation to estimate pixel values in that region from neighboring pixel values.

Preferable aspects of the segmenting include mapping the three dimensional color space of the pixels in each portion to a one dimensional line segment. The segmenting also preferably includes establishing a reference color for each portion; and determining a corresponding anchor color based on the established reference color; wherein the one dimensional line segment is defined by the reference color at one end and the anchor color at the other end. The segmenting still further preferably includes quantizing the one dimensional line segment into a plurality of bins, each of which is identified with a bin-index; creating a co-occurrence matrix M[i][j] for each portion, M[i][j] being equal to the number of pixel locations in that portion, such that a current pixel has bin-index i and its right or bottom neighbor has bin-index j; selecting a threshold that creates two areas in the co-occurrence matrix and that maximizes the entropy of the data in each of the two areas; and identifying pixels having a bin-index greater than the threshold as missing data.

Preferably, the calculating comprises performing a component filtering operation.

Preferably, for each pixel value estimated, the closest-to-radial-based-function filtering operation comprises using color values of neighboring pixels, without introducing any new colors, to estimate that pixel value and to fill each region of missing data. The closest-to-radial-based-function filtering operation considers spatial distribution and color distribution information in estimating pixel values to fill each region of missing data.

According to another aspect of the invention, an apparatus is provided for processing data in at least one portion of a pixel representation of film that has been scanned to generate a pixel representation. The apparatus comprises: a segmentation module that segments at least a portion of the pixel representation to identify at least one region of missing data; a calculator that calculates an area/perimeter ratio for each identified region of missing data; and a closest-to-radial-based-function filter that subjects each identified region of missing data having an area/perimeter ratio less than a predetermined maximum to a closest-to-radial-based-function filtering operation to estimate pixel values in that region from neighboring pixel values.

Preferable features of the segmentation module include mapping the three dimensional color space of the pixels in each portion to a one dimensional line segment. The segmentation module also preferably establishes a reference color for each portion; and determines a corresponding anchor color based on the established reference color; wherein the one dimensional line segment is defined by the reference color at one end and the anchor color at the other end. The segmentation module still further preferably quantizes the one dimensional line segment into a plurality of bins, each of which is identified with a bin-index; creates a co-occurrence matrix M[i][j] for each portion, M[i][j] being equal to the number of pixel locations in that portion, such that a current pixel has bin-index i and its right or bottom neighbor has bin-index j; selects a threshold that creates two areas in the co-occurrence matrix and that maximizes the entropy of the data in each of the two areas; and identifies pixels having a bin-index greater than the threshold as missing data.

Preferably, the calculator performs a component filtering operation.

Preferably, for each pixel value estimated, the closest-to-radial-based-function filtering operation comprises using color values of neighboring pixels, without introducing any new colors, to estimate that pixel value and to fill each region of missing data. The closest-to-radial-based-function filtering considers spatial distribution and color distribution information in estimating pixel values to fill each region of missing data.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware components, or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
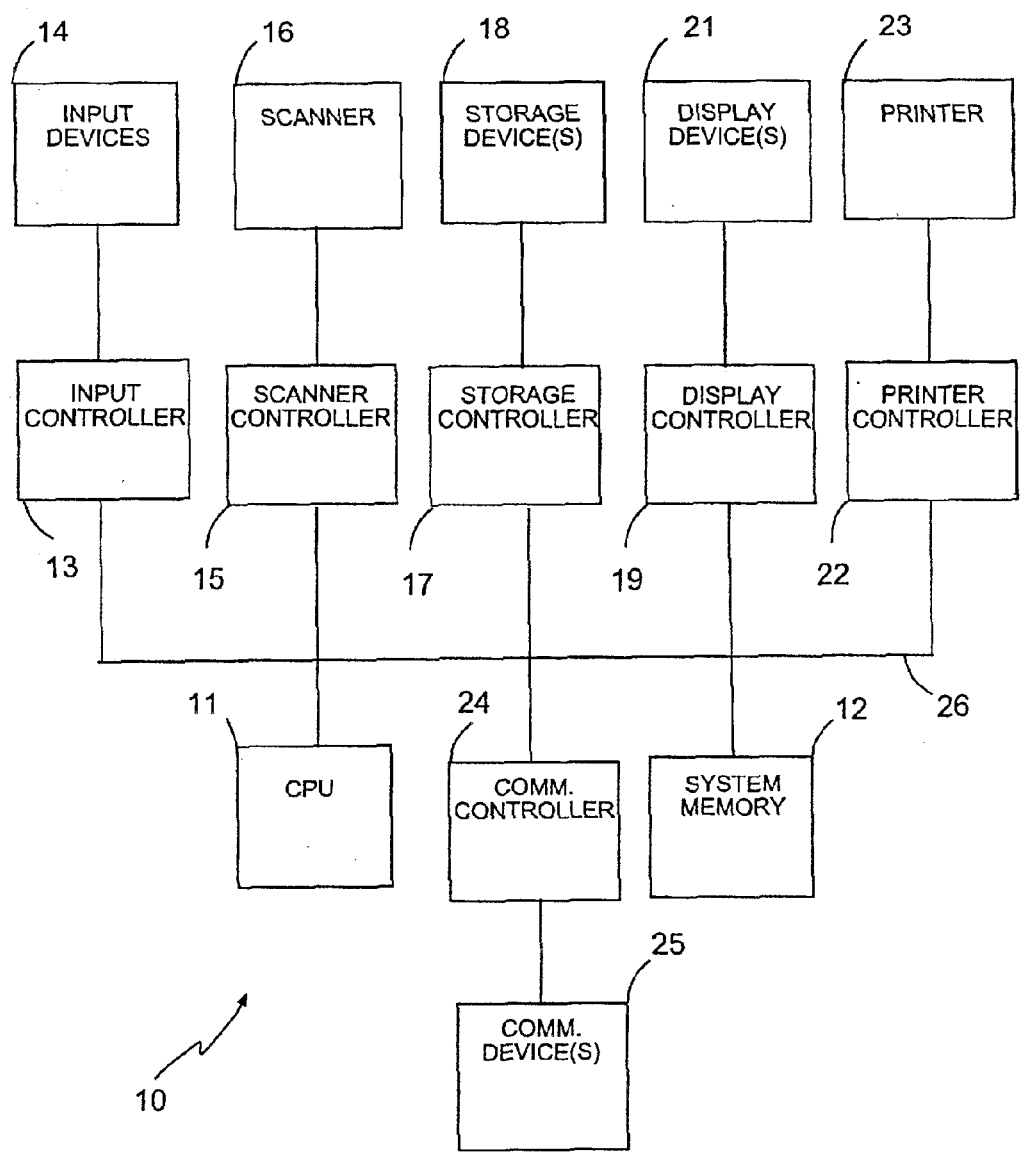
FIG. 1 is a block diagram illustrating components in an exemplary image processing/reproduction system that may be used to implement aspects of the present invention.

FIG. 1 illustrates components in a typical image processing system 10 in which the techniques of the present invention can be employed. As illustrated in FIG. 1, the system includes a central processing unit (CPU) 11 that provides computing resources and controls the computer. CPU 11 may be implemented with a microprocessor or the like, and may also include a graphics processor and/or a floating point coprocessor for mathematical computations. System 10 further includes system memory 12 which may be in the form of random-access memory (RAM) and read-only memory (ROM).

A number of controllers and peripheral devices are also provided, as shown in FIG. 1. Input controller 13 represents an interface to one or more input devices 14, such as a keyboard, mouse or stylus. There is also a controller 15 which communicates with a scanner 16 or equivalent device for digitizing documents including photographic images. A storage controller 17 interfaces with one or more storage devices 18 each of which includes a storage medium such as magnetic tape or disk, or an optical medium that may be used to record programs of instructions for operating systems, utilities and applications which may include embodiments of programs that implement various aspects of the present invention. Storage device(s) 18 may also be used to store data to be processed in accordance with the invention. A display controller 19 provides an interface to a display device 21 which may be a cathode ray tube (CRT) or thin film transistor (TFT) display. A printer controller 22 is also provided for communicating with a printer 23 for printing documents including photographic images processed in accordance with the invention. A communications controller 24 interfaces with a communication device 25 which enables system 10 to connect to remote devices through any of a variety of networks including the Internet, a local area network (LAN), a wide area network (WAN), or through any suitable electromagnetic carrier signals including infrared signals.

In the illustrated embodiment, all major system components connect to bus 26 which may represent more than one physical bus. For example, some personal computers incorporate only a so-called Industry Standard Architecture (ISA) bus. Other computers incorporate an ISA bus as well as a higher bandwidth bus.

While all system components may be located in physical proximity to one another, such is not a requirement of the invention. For example, scanner 16 may be located remotely of processor 11. Also, programs that implement various aspects of this invention may be accessed from a remote location (e.g., a server) over a network. Thus, scanned data or software embodying a program that implements various aspects of the invention may be conveyed to processor 11 through any of a variety of machine-readable medium including magnetic tape or disk or optical disc, any of which may be used to implement system memory 12 or storage device(s) 18, network signals or other suitable electromagnetic carrier signals including infrared signals.

Overview

The techniques of the present invention segment missing data regions (which may include characters in a date field). Of all the missing data regions segmented, only those having an area/perimeter ratio less than a certain threshold are kept for further processing. Those regions are filtered using a "closest to radial basis function" (CRBF) approach. Missing data regions may be lighter or darker than the neighboring pixels. For example, scratched film negatives show "dark" scratches, while lint on a scanner bed shows "light" scratches on the scanned representation. Light scratches typically show on photos, but old photographs may exhibit "dark" spots. The segmenting and filtering employed in this invention is designed to handle all such blemishes.

Figure 2:
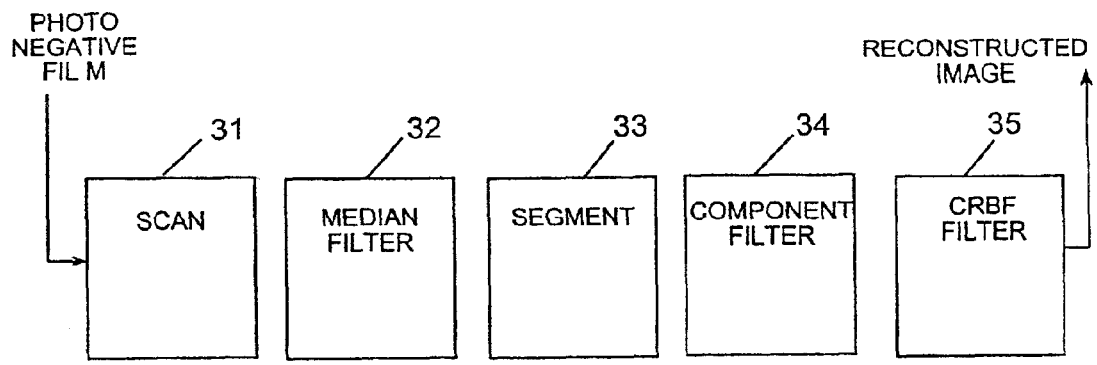
FIG. 2 is a block and flow diagram showing the overall processing according to embodiments of the invention.

The overall processing pipeline is shown in FIG. 2. A photograph or negative film having one or more regions of missing data is scanned in block 31. A suitable median filter having a relatively small kernel (e.g., 3×3) is applied to the pixels of the resulting digital representation in block 32. Then, in block 33, the representation is segmented to identify blemishes or missing data regions. Those regions are then subjected to two types of filtering: component filtering (block 34) and CRBF filtering (block 35). The representation is then reconstructed with missing data regions identified in the segmenting operation filled in. The segmenting, component filtering and CRBF filtering are described in more detail below.

Segmenting (i) A reference color ($RGB_{ref}$) is established for a particular sub-portion of the representation that generally coincides with a missing data region. A reference color can be established for more than one sub-portion of the representation, in which case the processing described below will be repeated for each such portion. $RGB_{ref}$ may be one of a number of pre-stored colors or supplied by the user by clicking on the color of interest on a preview scan of the particular image being processed. For example, if a date on a photograph is to be removed, $RGB_{ref}$ is typically the color that was used to overlay the date on the film. A second color, $RGB_{anchor}$, which is the farthest color from $RGB_{ref}$ in the RGB color space cube, is then determined from the equation below:

$$RGB_{anchor} = \operatorname*{argmax}_{RGB} \|RGB - RGB_{ref}\|$$

Figure 3:
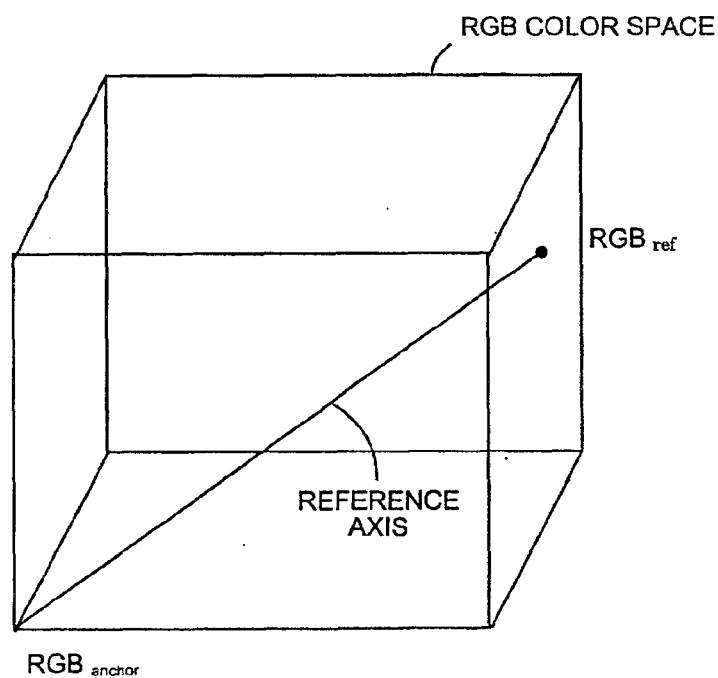
FIG. 3 is a schematic representation of color points $RGB_{anchor}$ and $RGB_{ref}$ in RGB color space and the line segment ("reference axis") extending between them.

$RGB_{anchor}$ is one of the vertices of the RGB color cube. A schematic representation of these color points in RGB color space, as well as the line segment extending from $RGB_{anchor}$ to $RGB_{ref}$ (referred to as the "reference axis") is illustrated in FIG. 3.

The RGB color space is then projected onto the 1-dimensional reference axis with a projection function P( ) such that, $P(RGB_{anchor})=0$ and $P(RGB_{ref})=1$. If any corner projects to a number>$T_{project}$, where $0<T_{project}<1$, then the corner is moved parallel to the reference axis until the projection is equal to $T_{project}$, which is typically equal to about 0.75. As a result of this operation, the 3-D color space is mapped to a 1-D color line segment with $RGB_{anchor}$ and $RGB_{ref}$ at the ends. Reducing the dimensionality increases the speed of the segmentation algorithm. Also, since $RGB_{ref}$ is relatively bright for date fields and relatively dark for scratches or the like, any color space distortion (which occurs if $T_{project}>1$) is not too severe. The above reference and anchor point determination methods, as well as the projection operation, may alternatively be performed in other color spaces such as CIE Lab, etc.

Figure 4:
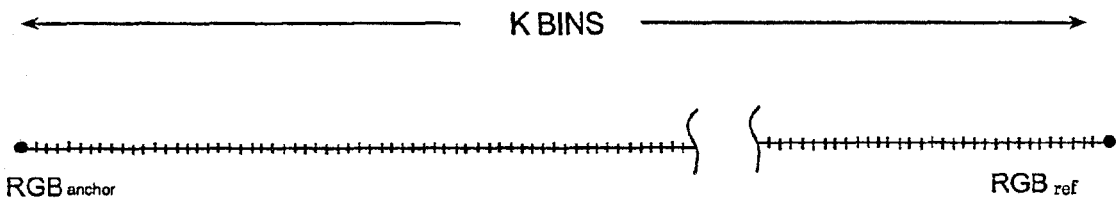
FIG. 4 is a schematic representation of the reference axis quantized into K bins for use in the segmenting operation.

(ii) Next, the reference axis is quantized into K (typically K=256) bins, as shown in FIG. 4. Each color in the image is now identified by its bin-index (which ranges from 0 to 255 for K=256).

Figure 5:
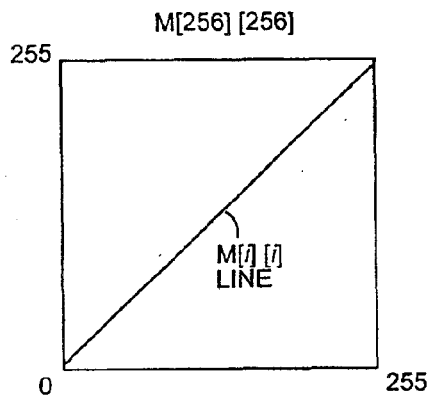
FIG. 5 is a schematic representation of a co-occurrence matrix for use in the segmenting operation.

(iii) A "co-occurrence" matrix M[K][K] is created. M[i][j]=the number of pixel locations, such that the current pixel has bin-index i and its right or bottom neighbor has bin-index j. In matrix M, pixels that cluster around the M[i][i] line, shown in FIG. 5, belong to connected regions with similar colors.

Figure 6:
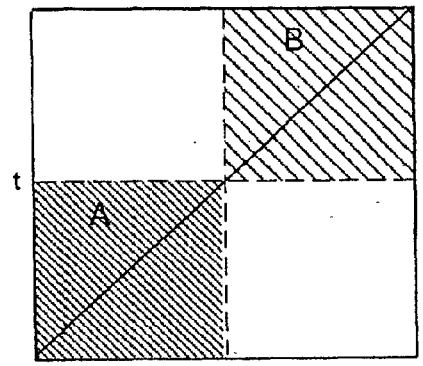
FIG. 6 is a schematic representation of the co-occurrence matrix showing the two regions A and B created by threshold t.

(iv) A threshold t is selected, where 0<t<K, that creates two regions, A and B, in M, as shown in FIG. 6. The segmenting algorithm considers each possible t and selects t, such that a distinct cluster of pixel data, roughly corresponding to a continuous region, is found in each of A and B. The algorithm uses a "flatness" or "maximum entropy" criteria such that t is selected to maximize the entropy of the data in each of A and B. Mathematically, this process is described as follows.

Let, $$p_{ij}^r = \frac{M_{ij}}{\sum_{p,q \in r} M_{pq}},$$

$\forall i,j \in r$, where r denotes region A or B.

Choose t such that $$t = \operatorname*{argmax}_{t} \sum_{r=A,B} \left( -N_r \sum_{i,j \in r} p_{ij}^r \ln p_{ij}^r \right)$$

where $N_r$=number of pixels in region r.

All pixels with bin-index>t are marked as "missing data."

Alternatively, the segmentation step may be performed by having the user specify a radius, R*. In this case, all colors, such that $\|RGB - RGB_{ref}\| < R^*$ are classified as "missing data."

The segmentation step can be performed for just one sub-portion of the representation or can be performed individually for any number of sub-portions of the image.

Component Filtering

Most of the time regions identified as missing data regions are in fact just that. However, occasionally a region is identified as a missing data region when it is not. One way to handle this situation is to simply treat the region as a missing data region and let the CRFB filtering process estimate the colors, which would not likely have much effect on the quality of the processed image.

However, another preferred way is to perform component filtering to identify any region that has been misidentified as a missing data region. To do this, the area and perimeter length of each missing data region identified in the segmenting step is computed. Any region whose area/perimeter ratio is greater than or equal to a predetermined threshold is discarded from a "missing data region" list. Only regions having an area/perimeter ratio less than the threshold are retained for further processing. The threshold may be set at 0.94, for example, or it may be set by the user. A user may adjust the threshold using an on-screen a slider, for example.

CRBF Filtering

Figure 7A:
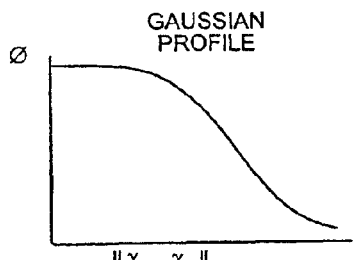
FIGS. 7(a) and 7(b) show the relationship between the RBF function $\phi$ and the absolute difference between its two variables $\|x_1-x_2\|$ which may be linear as shown in FIG. 7(a) or gaussian as shown in FIG. 7(b).
Figure 7B:
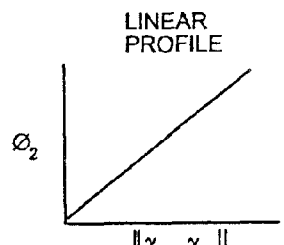
Figure 8:
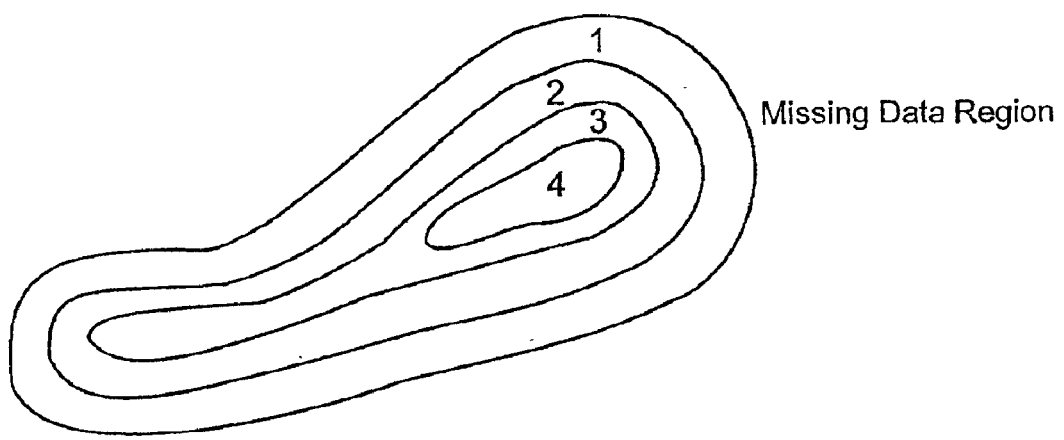
FIG. 8 is a schematic representation of a distance layer map used in the CRBF filtering operation.
Figure 2:
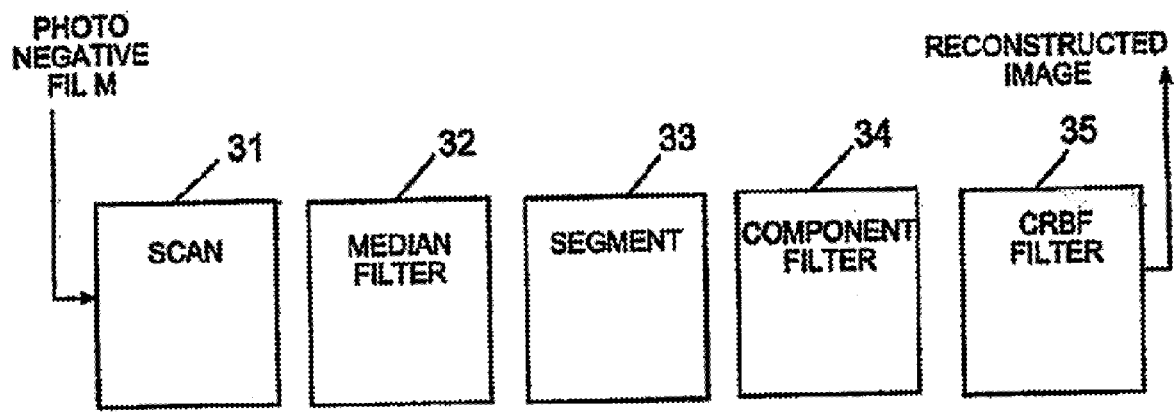
Figure 5:
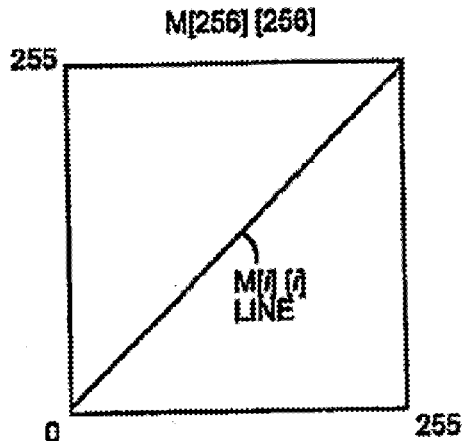
Figure 6:
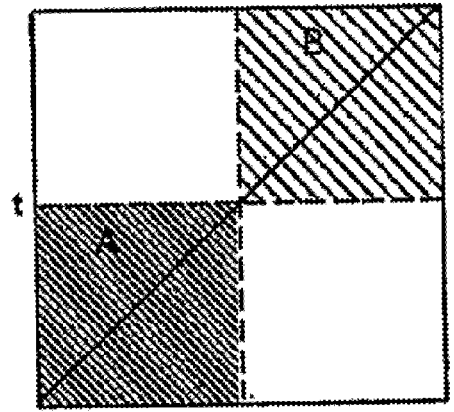
Figure 7A:
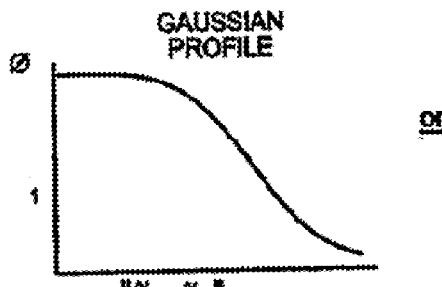
Figure 7B:
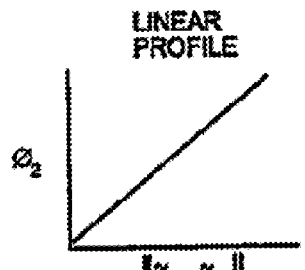
Figure 2:
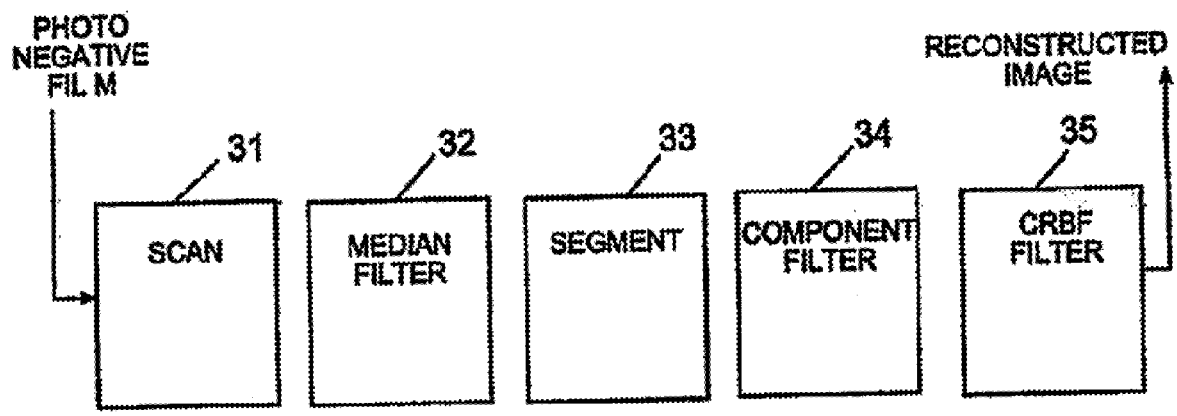
Figure 5:
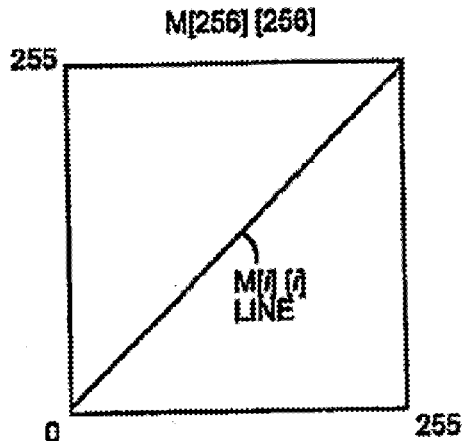
Figure 6:
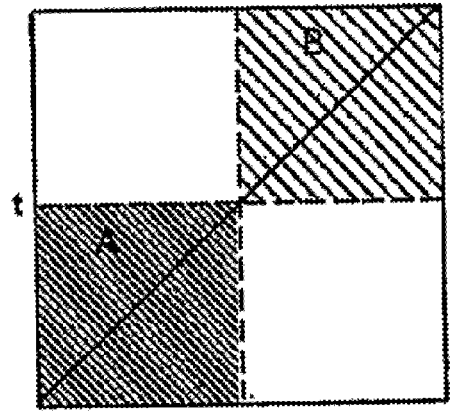
Figure 7A:
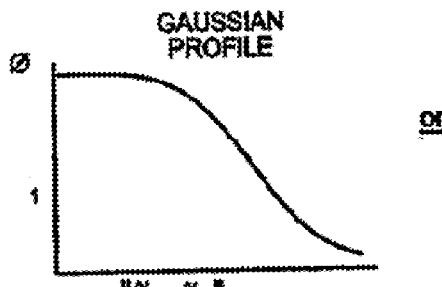
Figure 7B:
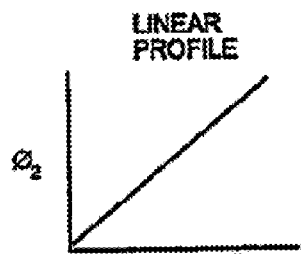
Figure 2:
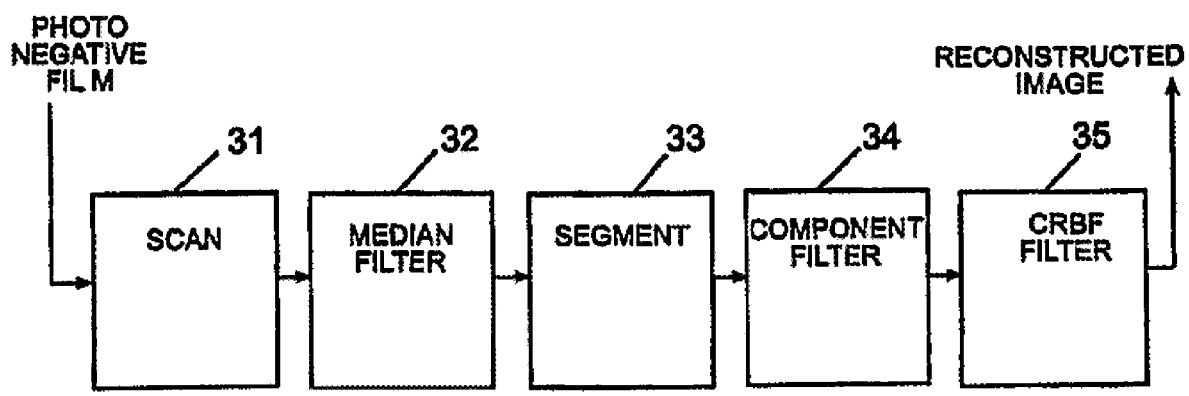
Figure 5:
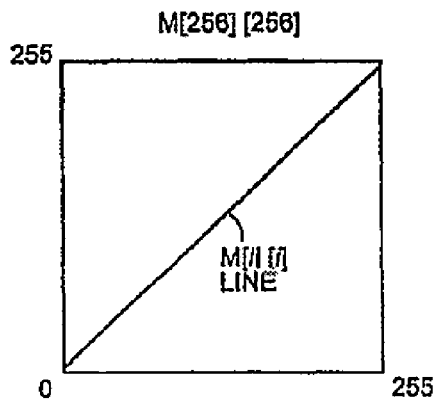
Figure 6:
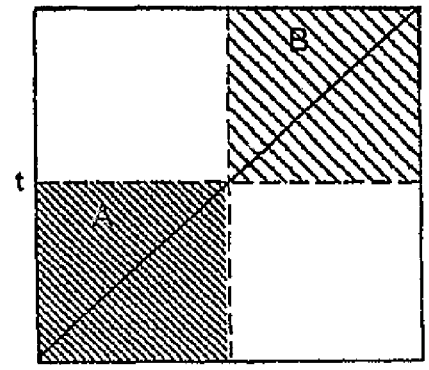
Figure 7A:
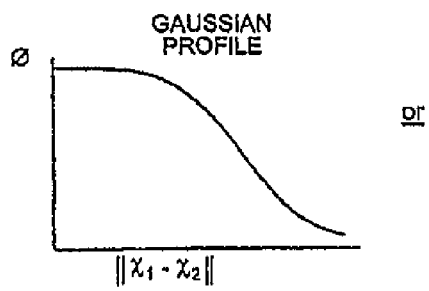
Figure 7B:
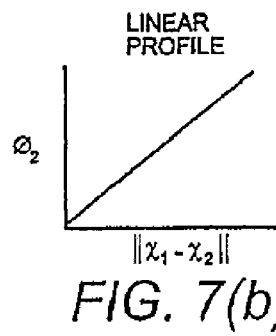

Each missing data region which is retained is now subjected to closest-to-radial-based-function (CRFB) filtering to estimate colors from neighboring pixels to be used to fill in that region. RBF is a function $\phi(x_1,x_2)$ such that $\phi(x_1,x_2)=\phi(\|x_1-x_2\|)$. The relationship between $\phi$ and $\|x_1-x_2\|$ may be a linear profile or a gaussian profile, as shown in FIGS. 7(a) and 7(b) respectively. One advantage of the CRBF filter is that it combines both spatial distribution and color distribution information about a pixel, Nbd. Moreover, with the CRBF approach, no new colors are introduced in the image. The process is as follows:

(i) A "distance layer" map for each missing data region is created, as shown in FIG. 8. Each pixel in the missing data region is assigned a layer number which represents the Manhattan-distance to the closest non-missing-data pixel.

(ii) For each pixel $p_{ij}$ in layer L, for each color channel, let, $Nbd_{ij} = \{p_{rs}: \text{layer\_number}(p_{rs}) < L \text{ and } |i-r|+|j-s| < D\}$, where D is typically 1 or 2. For each r, $s \in Nbd_{ij}$, an RBF, $\phi_{rs}$, is associated therewith.

Estimate $\lambda_{rs}$ such that $$\lambda_{rs}^* = \operatorname*{argmin}_{\lambda_{rs}} \sum_{m,n \in Nbd_{ij}} \left[ \sum_{r,s \in Nbd_{ij}} \lambda_{rs} \phi_{rs}(\|(r,s)-(m,n)\|) - p_{mn} \right]^2$$

(iii) $p_{ij}$ is estimated by $$\hat{p}_{ij} = \sum_{r,s \in Nbd_{ij}} \lambda_{rs}^* \phi_{rs}(\|(r,s)-(i,j)\|)$$

(iv) The pixel value for the i,j pixel is chosen as $$p_{ij}^* = \operatorname*{argmin}_{p_{mn} \in Nbd_{ij}} \|p_{mn} - \hat{p}_{ij}\|$$

(closest pixel to RBF estimate)

Such an RBF filter advantageously combines both spatial distribution and color distribution information about a pixel nbd. Using a CRBF approach, no new colors are introduced in the image.

An alternative approach for choosing the pixel value for the i,j pixel in step (iv) of the CRBF filtering process is to use $\hat{p}_{ij}$ as the estimate instead of $p_{ij}^*$. However, the processed image tends to be more blurred in the missing data regions.

Effects and Implementations

As the foregoing description demonstrates, the present invention provides effective scratch and date removal techniques for scanned film which may be conveniently implemented using a scanner and software running on a personal computer or other processing device. The techniques of the present invention may also be implemented with hardware components, such as one or more application specific integrated circuits (ASICs), digital signal processors, program-controlled processors, or the like. A combination of software and hardware may also be used to implement the photo extraction technique. With these implementation alternatives in mind, it is to be understood that the block and flow diagrams show the performance of certain specified functions and relationships thereof. The boundaries of these functional blocks have been defined herein for convenience of description. Alternate boundaries may be defined so long as the specified functions are performed and relationships therebetween are appropriately maintained. The diagrams and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for processing data in at least one portion of film that has been scanned to generate a pixel representation, comprising the steps of:
    (a) segmenting at least one portion of the pixel representation to identify at least one region of missing data;
    (b) calculating an area/perimeter ratio for each identified region of missing data; and
    (c) subjecting each identified region of missing data having an area/perimeter ratio less than a predetermined maximum to a closest-to-radial-based-function filtering operation to estimate pixel values in that region from neighboring pixel values.

2. The method of claim 1, wherein each pixel represents a color within a three dimensional color space, and wherein the segmenting comprises mapping the three dimensional color space of the pixels in each portion to a one dimensional line segment.

3. The method of claim 2, wherein the segmenting further comprises:
    establishing a reference color for each portion; and
    determining a corresponding anchor color based on the established reference color;
    wherein the one dimensional line segment is defined by the reference color at one end and the anchor color at the other end.

4. The method of claim 3, wherein the segmenting further comprises:
    quantizing the one dimensional line segment into a plurality of bins, each of which is identified with a bin-index;
    creating a co-occurrence matrix M[i][j] for each portion, M[i][j] being equal to the number of pixel locations in that portion, such that a current pixel has bin-index i and its right or bottom neighbor has bin-index j;
    selecting a threshold that creates two areas in the co-occurrence matrix and that maximizes the entropy of the data in each of the two areas; and
    identifying pixels having a bin-index greater than the threshold as missing data.

5. The method of claim 1, wherein the calculating comprises performing a component filtering operation.

6. The method of claim 1, wherein, for each pixel value estimated, the closest-to-radial-based-function filtering operation comprises using color values of neighboring pixels, without introducing any new colors, to estimate that pixel value and to fill each region of missing data.

7. The method of claim 6, wherein the closest-to-radial-based-function filtering operation considers spatial distribution and color distribution information in estimating pixel values to fill each region of missing data.

8. An apparatus for processing data in at least one portion of a pixel representation of film that has been scanned to generate a pixel representation, comprising:
    a segmentation module that segments at least a portion of the pixel representation to identify at least one region of missing data;
    a calculator that calculates an area/perimeter ratio for each identified region of missing data; and
    a closest-to-radial-based-function filter that subjects each identified region of missing data having an area/perimeter ratio less than a predetermined maximum to a closest-to-radial-based-function filtering operation to estimate pixel values in that region from neighboring pixel values.

9. The apparatus of claim 8, wherein each pixel represents a color within a three dimensional color space, and wherein the segmentation module maps the three dimensional color space of the pixels in each portion to a one dimensional line segment.

10. The apparatus of claim 9, wherein the segmentation module
    establishes a reference color for each portion; and
    determines a corresponding anchor color based on the established reference color;
    wherein the one dimensional line segment is defined by the reference color at one end and the anchor color at the other end.

11. The apparatus of claim 10, wherein the segmentation module
    quantizes the one dimensional line segment into a plurality of bins, each of which is identified with a bin-index;
    creates a co-occurrence matrix M[i][j] for each portion, M[i][j] being equal to the number of pixel locations in that portion, such that a current pixel has bin-index i and its right or bottom neighbor has bin-index j;
    selects a threshold that creates two areas in the co-occurrence matrix and that maximizes the entropy of the data in each of the two areas; and
    identifies pixels having a bin-index greater than the threshold as missing data.

12. The apparatus of claim 8, wherein the calculator performs a component filtering operation.

13. The apparatus of claim 8, wherein, for each pixel value estimated, the closest-to-radial-based-function filtering operation comprises using color values of neighboring pixels, without introducing any new colors, to estimate that pixel value and to fill each region of missing data.

14. The apparatus of claim 13, wherein the closest-to-radial-based-function filtering considers spatial distribution and color distribution information in estimating pixel values to fill each region of missing data.

15. A machine-readable medium having a program of instructions for directing a machine to process data in at least one portion of film that has been scanned to generate a pixel representation, the program of instructions comprising:

(a) instructions for segmenting at least one portion of the pixel representation to identify at least one region of missing data;

(b) instructions for calculating an area/perimeter ratio for each identified region of missing data; and (c) instructions for subjecting each identified region of missing data having an area/perimeter ratio less than a predetermined maximum to a closest-to-radial-based-function filtering operation to estimate pixel values in that region from neighboring pixel values.

16. The machine-readable medium of claim 15, wherein each pixel represents a color within a three dimensional color space, and wherein the segmenting comprises mapping the three dimensional color space of the pixels in each portion to a one dimensional line segment.

17. The machine-readable medium of claim 16, wherein the segmenting instructions further comprise:

instructions for establishing a reference color for each portion; and instructions for determining a corresponding anchor color based on the established reference color;

wherein the one dimensional line segment is defined by the reference color at one end and the anchor color at the other end.

18. The machine-readable medium of claim 17, wherein the segmenting instructions further comprises:

instructions for quantizing the one dimensional line segment into a plurality of bins, each of which is identified with a bin-index;

instructions for creating a co-occurrence matrix M[i][j] for each portion, M[i][j] being equal to the number of pixel locations in that portion, such that a current pixel has bin-index i and its right or bottom neighbor has bin-index j;

instructions for selecting a threshold that creates two areas in the co-occurrence matrix and that maximizes the entropy of the data in each of the two areas; and instructions for identifying pixels having a bin-index greater than the threshold as missing data.

19. The machine-readable medium of claim 15, wherein the calculating instructions comprises instructions for performing a component filtering operation.

20. The machine-readable medium of claim 15, wherein, for each pixel value estimated, the closest-to-radial-based-function filtering operation comprises using color values of neighboring pixels, without introducing any new colors, to estimate that pixel value and to fill each region of missing data.

21. The machine-readable medium of claim 20, wherein the closest-to-radial-based-function filtering operation considers spatial distribution and color distribution information in estimating pixel values to fill each region of missing data.

* * * * *

UNITED STATES PATENT AND TRADEMARK OFFICE
CERTIFICATE OF CORRECTION

PATENT NO.        : 6,862,366 B2
APPLICATION NO. : 09/952691
DATED             : March 1, 2005
INVENTOR(S)       : Anoop K. Bhattacharjya It is certified that error appears in the above-identified patent and that said Letters Patent is hereby corrected as shown below:

Delete Title illustrating figure, and substitute therefor new Title page illustrating figure. (attached)

Delete drawing sheet 2 of 4, and substitute therefor drawing sheet 2 of 4, as shown on the attach page.

Signed and Sealed this

Twentieth Day of February, 2007

JON W. DUDAS
*Director of the United States Patent and Trademark Office*

(12) United States Patent
Bhattacharjya

(10) Patent No.: US 6,862,366 B2
(45) Date of Patent: Mar. 1, 2005

(54) TECHNIQUES FOR SCRATCH AND DATE REMOVAL FROM SCANNED FILM

(75) Inventor: Anoop Bhattacharjya, Campbell, CA (US)

(73) Assignee: Seiko Epson Corporation, Tokyo (JP)

(*) Notice: Subject to any disclaimer, the term of this patent is extended or adjusted under 35 U.S.C. 154(b) by 705 days.

(21) Appl. No.: 09/952,691

(22) Filed: Sep. 13, 2001

(65) Prior Publication Data
US 2003/0053707 A1 Mar. 20, 2003

(51) Int. Cl.$^7$ .................. G06K 9/00; G06K 9/40
(52) U.S. Cl. .................. 382/164; 382/262; 382/275
(58) Field of Search .................. 382/162–165, 382/167, 172–173, 251, 254, 260, 262, 264, 300, 274–276; 358/463, 534; 348/241, 607, 625; 356/237.1

(56) References Cited

U.S. PATENT DOCUMENTS

| | | | |
|---|---|---|---|
| 4,941,185 A | 7/1990 | Massmann | 382/275 |
| 5,384,865 A | 1/1995 | Loveridge | 382/262 |
| 5,627,918 A | 5/1997 | Carasso | 382/254 |
| 5,694,228 A | 12/1997 | Perirs et al. | 358/538 |
| 5,892,853 A | 4/1999 | Hirani et al. | 382/280 |
| 5,974,194 A | 10/1999 | Hirani et al. | 382/262 |
| 6,035,072 A | 3/2000 | Read | 382/275 |
| 6,075,590 A * | 6/2000 | Edgar | 356/237.1 |
| 6,075,889 A * | 6/2000 | Hamilton et al. | 382/167 |
| 6,163,324 A | 12/2000 | Holder | 345/505 |
| 6,167,152 A | 12/2000 | Schildkraut | 382/163 |
| 6,192,153 B1 * | 2/2001 | Fan | 382/232 |
| 6,393,160 B1 * | 5/2002 | Edgar | 382/275 |
| 6,418,243 B1 * | 7/2002 | Skoglund et al. | 382/274 |
| 6,476,803 B1 * | 11/2002 | Zhang et al. | 345/419 |
| 6,498,867 B1 * | 12/2002 | Potucek et al. | 382/274 |
| 6,640,015 B1 * | 10/2003 | Lafruit et al. | 382/260 |
| 6,683,995 B2 * | 1/2004 | Ford et al. | 382/275 |

* cited by examiner

Primary Examiner—Andrew W. Johns
Assistant Examiner—Amir Alavi
(74) Attorney, Agent, or Firm—Michael T. Gabrik

(57) ABSTRACT

Techniques for removing from scanned film regions of "missing data" which may include date regions, or may be the result of spots, scratches or folds on the film. Such techniques are particularly designed to handle larger regions of missing data, such as "thick" scratches. The techniques of the present invention segment missing data regions (which may include characters in a date field) and perform component filtering which involves determining the area/perimeter ratio of each segmented missing data region. Only those regions whose area/perimeter ratio is less than a certain threshold are kept for closest-to-radial-based-function (CRBF) filtering to estimate colors from neighboring pixels to fill in the missing data regions.

21 Claims, 4 Drawing Sheets

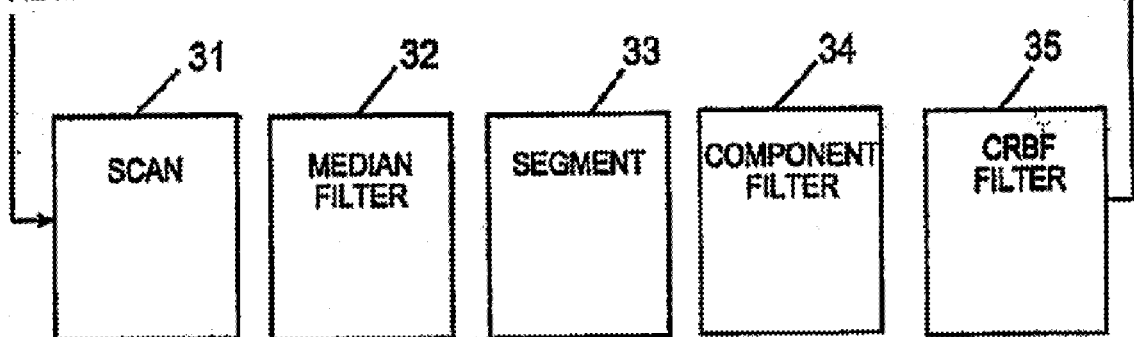

or

UNITED STATES PATENT AND TRADEMARK OFFICE
CERTIFICATE OF CORRECTION

PATENT NO. : 6,862,366 B2
APPLICATION NO. : 09/952691
DATED : March 1, 2005
INVENTOR(S) : Anoop K. Bhattacharjya It is certified that error appears in the above-identified patent and that said Letters Patent is hereby corrected as shown below:

Delete Title illustrating figure, and substitute therefor new Title page illustrating figure. (attached)

Delete drawing sheet 2 of 4, and substitute therefor drawing sheet 2 of 4, as shown on the attach page.

This certificate supersedes Certificate of Correction issued February 20, 2007.

Signed and Sealed this

Twenty-seventh Day of March, 2007

JON W. DUDAS
*Director of the United States Patent and Trademark Office*

(12) United States Patent
Bhattacharjya

(10) Patent No.: US 6,862,366 B2
(45) Date of Patent: Mar. 1, 2005

(54) TECHNIQUES FOR SCRATCH AND DATE REMOVAL FROM SCANNED FILM

(75) Inventor: Anoop Bhattacharjya, Campbell, CA (US)

(73) Assignee: Seiko Epson Corporation, Tokyo (JP)

(*) Notice: Subject to any disclaimer, the term of this patent is extended or adjusted under 35 U.S.C. 154(b) by 705 days.

(21) Appl. No.: 09/952,691

(22) Filed: Sep. 13, 2001

(65) Prior Publication Data
US 2003/0053707 A1 Mar. 20, 2003

(51) Int. Cl.$^7$ .................. G06K 9/00; G06K 9/40
(52) U.S. Cl. .................. 382/164; 382/262; 382/275
(58) Field of Search .................. 382/162–165, 382/167, 172–173, 251, 254, 260, 262, 264, 300, 274–276; 358/463, 534; 348/241, 607, 625; 356/237.1

(56) References Cited

U.S. PATENT DOCUMENTS

| | | | |
|---|---|---|---|
| 4,941,185 A | 7/1990 | Massmann | 382/275 |
| 5,384,865 A | 1/1995 | Loveridge | 382/262 |
| 5,627,918 A | 5/1997 | Carasso | 382/254 |
| 5,694,228 A | 12/1997 | Peairs et al. | 358/538 |
| 5,892,853 A | 4/1999 | Hirani et al. | 382/280 |
| 5,974,194 A | 10/1999 | Hirani et al. | 382/262 |
| 6,035,072 A | 3/2000 | Read | 382/275 |
| 6,075,590 A * | 6/2000 | Edgar | 356/237.1 |
| 6,075,889 A * | 6/2000 | Hamilton et al. | 382/167 |
| 6,163,324 A | 12/2000 | Holder | 345/505 |
| 6,167,152 A | 12/2000 | Schildkraut | 382/163 |
| 6,192,155 B1 * | 2/2001 | Fan | 382/232 |
| 6,393,160 B1 * | 5/2002 | Edgar | 382/275 |
| 6,418,243 B1 * | 7/2002 | Skoglund et al. | 382/274 |
| 6,476,803 B1 * | 11/2002 | Zhang et al. | 345/419 |
| 6,498,867 B1 * | 12/2002 | Potucek et al. | 382/274 |
| 6,640,015 B1 * | 10/2003 | Lafruit et al. | 382/260 |
| 6,683,995 B2 * | 1/2004 | Ford et al. | 382/275 |

* cited by examiner

*Primary Examiner*—Andrew W. Johns
*Assistant Examiner*—Amir Alavi
(74) *Attorney, Agent, or Firm*—Michael T. Gabrik

(57) ABSTRACT

Techniques for removing from scanned film regions of "missing data" which may include date regions, or may be the result of spots, scratches or folds on the film. Such techniques are particularly designed to handle larger regions of missing data, such as "thick" scratches. The techniques of the present invention segment missing data regions (which may include characters in a date field) and perform component filtering which involves determining the area/perimeter ratio of each segmented missing data region. Only those regions whose area/perimeter ratio is less than a certain threshold are kept for closest-to-radial-based-function (CRBF) filtering to estimate colors from neighboring pixels to fill in the missing data regions.

21 Claims, 4 Drawing Sheets

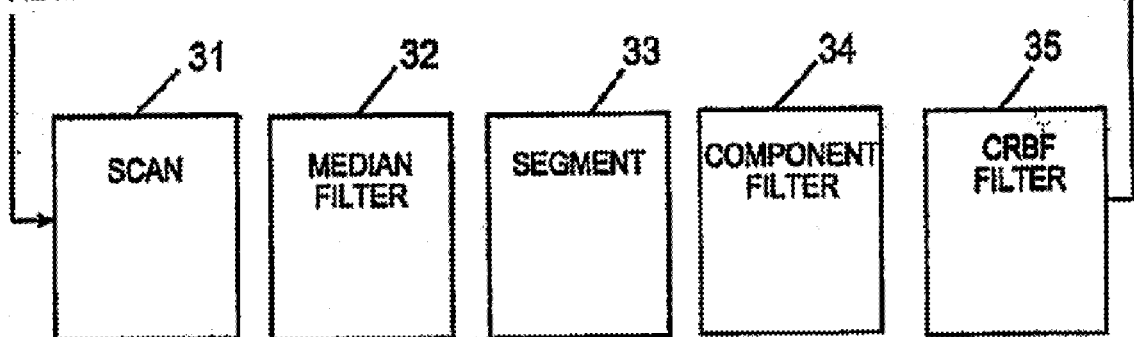

or

UNITED STATES PATENT AND TRADEMARK OFFICE
CERTIFICATE OF CORRECTION

PATENT NO.        : 6,862,366 B2
APPLICATION NO. : 09/952691
DATED             : March 1, 2005
INVENTOR(S)       : Anoop K. Bhattacharjya It is certified that error appears in the above-identified patent and that said Letters Patent is hereby corrected as shown below:

Delete Title illustrating figure, and substitute therefor new Title page illustrating figure. (attached)

Delete drawing sheet 2 of 4, and substitute therefor drawing sheet 2 of 4, as shown on the attach page.

This certificate supersedes Certificates of Correction issued February 20, 2007 and March 27, 2007.

Signed and Sealed this

Eighth Day of May, 2007

JON W. DUDAS
*Director of the United States Patent and Trademark Office*

United States Patent
Bhattacharjya

(10) Patent No.: US 6,862,366 B2
(45) Date of Patent: Mar. 1, 2005

(54) TECHNIQUES FOR SCRATCH AND DATE REMOVAL FROM SCANNED FILM

(75) Inventor: Anoop Bhattacharjya, Campbell, CA (US)

(73) Assignee: Seiko Epson Corporation, Tokyo (JP)

(*) Notice: Subject to any disclaimer, the term of this patent is extended or adjusted under 35 U.S.C. 154(b) by 705 days.

(21) Appl. No.: 09/952,691

(22) Filed: Sep. 13, 2001

(65) Prior Publication Data
US 2003/0053707 A1 Mar. 20, 2003

(51) Int. Cl.$^7$ .................. G06K 9/00; G06K 9/40
(52) U.S. Cl. .................. 382/164; 382/262; 382/275
(58) Field of Search .................. 382/162–165, 382/167, 172–173, 251, 254, 260, 262, 264, 300, 274–276; 358/463, 534; 348/241, 607, 625; 356/237.1

(56) References Cited

U.S. PATENT DOCUMENTS

| | | | | |
|---|---|---|---|---|
| 4,941,185 A | 7/1990 | Massmann | | 382/275 |
| 5,384,865 A | 1/1995 | Loveridge | | 382/262 |
| 5,627,918 A | 5/1997 | Carasso | | 382/254 |
| 5,694,228 A | 12/1997 | Peairs et al. | | 358/538 |
| 5,892,853 A | 4/1999 | Hirani et al. | | 382/280 |
| 5,974,194 A | 10/1999 | Hirani et al. | | 382/262 |
| 6,035,072 A | 3/2000 | Read | | 382/275 |
| 6,075,590 A | * 6/2000 | Edgar | | 356/237.1 |
| 6,075,889 A | * 6/2000 | Hamilton et al. | | 382/167 |
| 6,163,324 A | 12/2000 | Holder | | 345/505 |
| 6,167,152 A | 12/2000 | Schildkraut | | 382/163 |
| 6,192,155 B1 | * 2/2001 | Fan | | 382/232 |
| 6,393,160 B1 | * 5/2002 | Edgar | | 382/275 |
| 6,418,243 B1 | * 7/2002 | Skoglund et al. | | 382/274 |
| 6,476,803 B1 | * 11/2002 | Zhang et al. | | 345/419 |
| 6,498,867 B1 | * 12/2002 | Potucek et al. | | 382/274 |
| 6,640,015 B1 | * 10/2003 | Lafruit et al. | | 382/260 |
| 6,683,995 B2 | * 1/2004 | Ford et al. | | 382/275 |

\* cited by examiner

*Primary Examiner*—Andrew W. Johns
*Assistant Examiner*—Amir Alavi
(74) *Attorney, Agent, or Firm*—Michael T. Gabrik

(57) ABSTRACT

Techniques for removing from scanned film regions of "missing data" which may include date regions, or may be the result of spots, scratches or folds on the film. Such techniques are particularly designed to handle larger regions of missing data, such as "thick" scratches. The techniques of the present invention segment missing data regions (which may include characters in a date field) and perform component filtering which involves determining the area/perimeter ratio of each segmented missing data region. Only those regions whose area/perimeter ratio is less than a certain threshold are kept for closest-to-radial-based-function (CRBF) filtering to estimate colors from neighboring pixels to fill in the missing data regions.

21 Claims, 4 Drawing Sheets

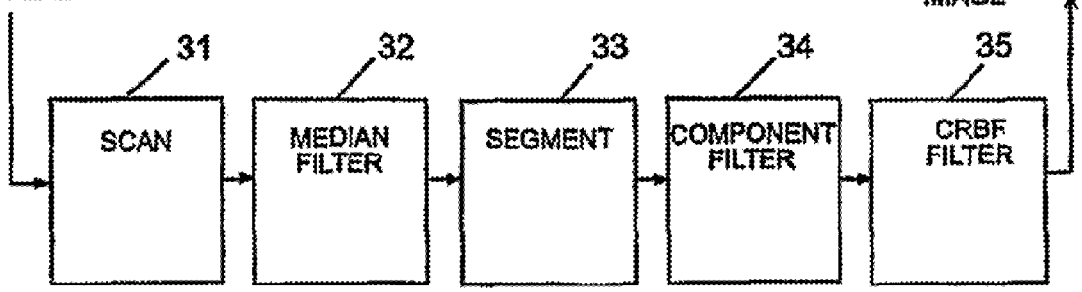

or